US012684540B2

(12) United States Patent
Cozzo et al.

(10) Patent No.: US 12,684,540 B2
(45) Date of Patent: Jul. 14, 2026

(54) METHOD AND APPARATUS FOR TIMING ADVANCE ADJUSTMENT

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 718 days.

(21) Appl. No.: 18/045,125

(22) Filed: Oct. 7, 2022

(65) Prior Publication Data

US 2023/0131305 A1     Apr. 27, 2023

Related U.S. Application Data

(60) Provisional application No. 63/279,939, filed on Nov. 16, 2021, provisional application No. 63/270,885, filed on Oct. 22, 2021.

(51) Int. Cl.
H04W 72/0446     (2023.01)
H04W 72/044     (2023.01)

(52) U.S. Cl.
CPC ...  H04W 72/0446 (2013.01); H04W 72/0473 (2013.01)

(58) Field of Classification Search
None
See application file for complete search history.

(56) References Cited

U.S. PATENT DOCUMENTS

| | | | |
|---|---|---|---|
| 10,419,259 B1 * | 9/2019 | Baldemair | H04W 72/21 |
| 2019/0174466 A1 * | 6/2019 | Zhang | H04L 5/0057 |
| 2019/0281588 A1 * | 9/2019 | Zhang | H04W 52/08 |
| 2019/0394075 A1 * | 12/2019 | Baldemair | H04W 74/0833 |
| 2020/0350949 A1 * | 11/2020 | Rico Alvarino | H04L 5/0094 |

(Continued)

FOREIGN PATENT DOCUMENTS

| KR | 10-2021-0104841 A | 8/2021 |
|---|---|---|
| WO | 2023055026 A1 | 4/2023 |

OTHER PUBLICATIONS

"5G; NR; Physical channels and modulation (3GPP TS 38.211 version 17.3.0 Release 17)", ETSI TS 138 211 V17.3.0, Sep. 2022, 141 pages.

(Continued)

*Primary Examiner* — Lonnie V Sweet

(57)     ABSTRACT

Apparatuses and methods for timing advance (TA) adjustment. A method includes receiving first information indicating use of same power and continuous phase for transmission of a channel over a number of slots and second information indicating a first TA value. The method includes determining a second slot for adjusting a time for the transmission of the channel based on the first TA value, a first power for the transmission of the channel in slots before the second slots, and a second power for the transmission of the channel in slots starting from the second slot. The method further includes adjusting the time for the transmission of the channel in the second slot based on the first TA value and transmitting the channel with a first power in slots before the second slot and with a second power in slots starting from the second slot.

12 Claims, 15 Drawing Sheets

(56) References Cited

U.S. PATENT DOCUMENTS

| | | | |
|---|---|---|---|
| 2021/0068065 A1 | 3/2021 | Wigard et al. | |
| 2021/0105731 A1 | 4/2021 | Lin | |
| 2021/0153193 A1* | 5/2021 | Lin | H04W 56/0045 |
| 2021/0329580 A1* | 10/2021 | Kim | H04W 56/0015 |
| 2022/0053442 A1 | 2/2022 | Luo et al. | |
| 2022/0060997 A1* | 2/2022 | Dinan | H04L 27/18 |
| 2022/0217782 A1* | 7/2022 | Nishio | H04B 7/1851 |
| 2023/0024493 A1* | 1/2023 | Sridharan | H04L 1/1887 |
| 2023/0216711 A1* | 7/2023 | Yao | H04L 5/0051 |
| | | | 370/328 |
| 2023/0216712 A1* | 7/2023 | Yao | H04L 25/0228 |
| 2023/0291523 A1* | 9/2023 | Hasegawa | H04L 5/0094 |
| 2023/0344508 A1* | 10/2023 | Tseng | H04W 56/005 |
| 2024/0314749 A1* | 9/2024 | Li | H04L 5/0094 |
| 2025/0056506 A1* | 2/2025 | Shim | H04L 1/08 |

OTHER PUBLICATIONS

"5G; NR; Multiplexing and channel coding (3GPP TS 38.212 version 17.3.0 Release 17)", ETSI TS 138 212 V17.3.0, Sep. 2022, 206 pages.

"5G; NR; Physical layer procedures for control (3GPP TS 38.213 version 17.3.0 Release 17)", ETSI TS 138 213 V17.3.0, Sep. 2022, 262 pages.

"5G; NR; Physical layer procedures for data (3GPP TS 38.214 version 17.3.0 Release 17)", ETSI TS 138 214 V17.3.0, Sep. 2022, 237 pages.

"3rd Generation Partnership Project; Technical Specification Group Radio Access Network; NR; Medium Access Control (MAC) protocol specification (Release 17)", 3GPP TS 38.321 V17.2.0, Sep. 2022, 246 pages.

"3rd Generation Partnership Project; Technical Specification Group Radio Access Network; NR; Radio Resource Control (RRC) protocol specification (Release 17)", 3GPP TS 36.331 V17.2.0, Sep. 2022, [[1304]] 1298 pages.

International Search Report and Written Opinion issued Feb. 3, 2023 regarding International Application No. PCT/KR2022/016287, 8 pages.

Interdigital, Inc., "Joint channel estimation for PUSCH", 3GPP TSG RAN WG1 #106b-e, R1-2110154, Oct. 2021, 12 pages.

Vivo, "Discussion on Joint channel estimation for PUSCH", 3GPP TSG RAN WG1 #106bis-e, R1-2108991, Oct. 2021, 10 pages.

Extended European Search Report issued Jan. 23, 2025 regarding Application No. 22884131.8, 16 pages.

LG Electronics, "Discussions on joint channel estimation for PUSCH", 3GPP TSG RAN WG1 #106b-e, R1-2110098, Oct. 2021, 12 pages.

Ericsson, "Joint Channel Estimation for PUSCH", 3GPP TSG-RAN WG1 Meeting #106bis-e, R1-2110124, Oct. 2021, 30 pages.

Samsung, "Joint channel estimation for PUSCH", 3GPP TSG RAN WG1 #106bis-e, R1-2109506, Oct. 2021, 8 pages.

* cited by examiner

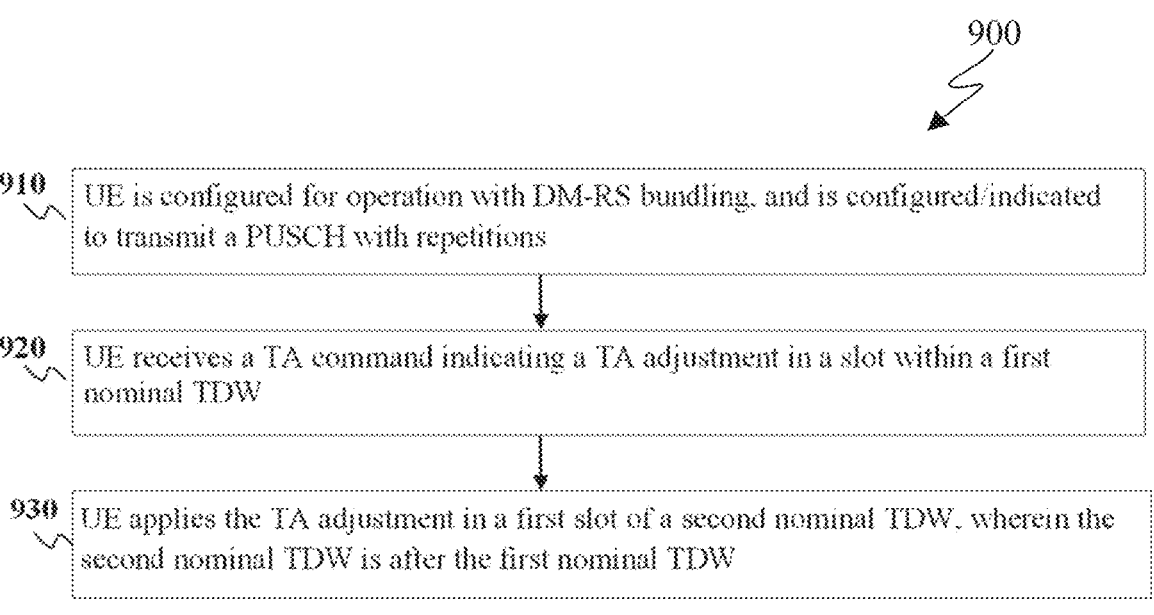

900

910  UE is configured for operation with DM-RS bundling, and is configured/indicated to transmit a PUSCH with repetitions 920  UE receives a TA command indicating a TA adjustment in a slot within a first nominal TDW 930  UE applies the TA adjustment in a first slot of a second nominal TDW, wherein the second nominal TDW is after the first nominal TDW

FIG. 9

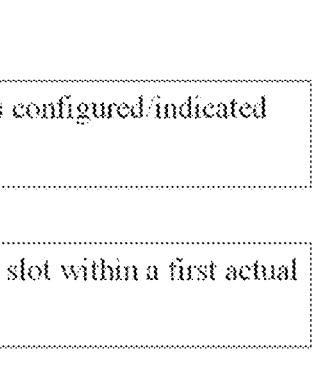

1000

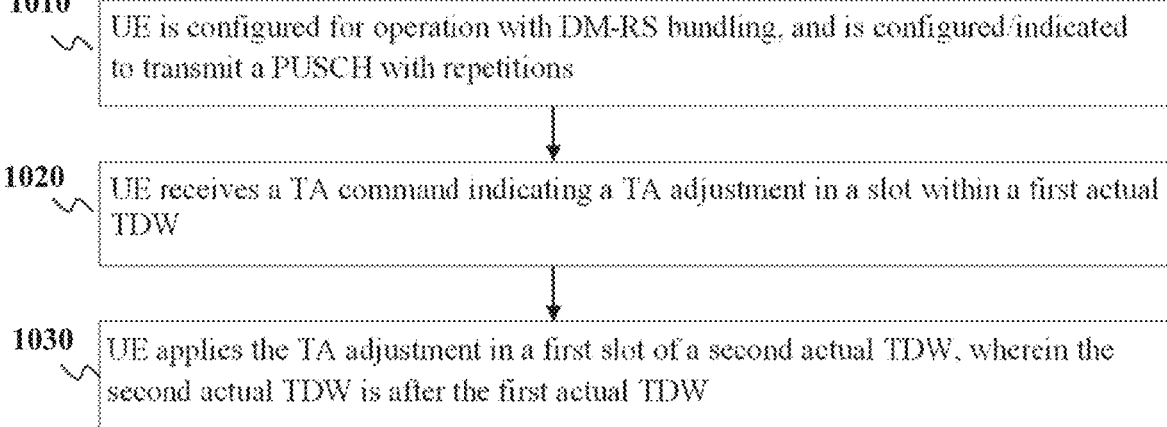

1010  UE is configured for operation with DM-RS bundling, and is configured/indicated to transmit a PUSCH with repetitions 1020  UE receives a TA command indicating a TA adjustment in a slot within a first actual TDW 1030  UE applies the TA adjustment in a first slot of a second actual TDW, wherein the second actual TDW is after the first actual TDW

FIG. 10

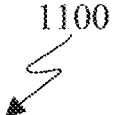
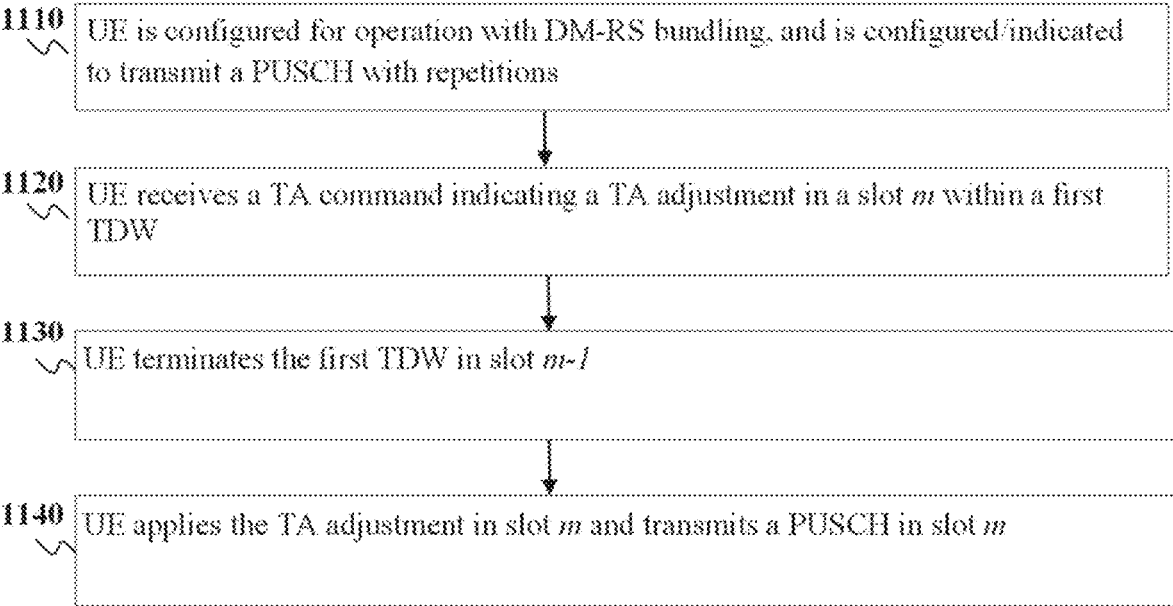
1110 UE is configured for operation with DM-RS bundling, and is configured/indicated to transmit a PUSCH with repetitions
1120 UE receives a TA command indicating a TA adjustment in a slot *m* within a first TDW
1130 UE terminates the first TDW in slot *m-1*
1140 UE applies the TA adjustment in slot *m* and transmits a PUSCH in slot *m*
FIG. 11

1200

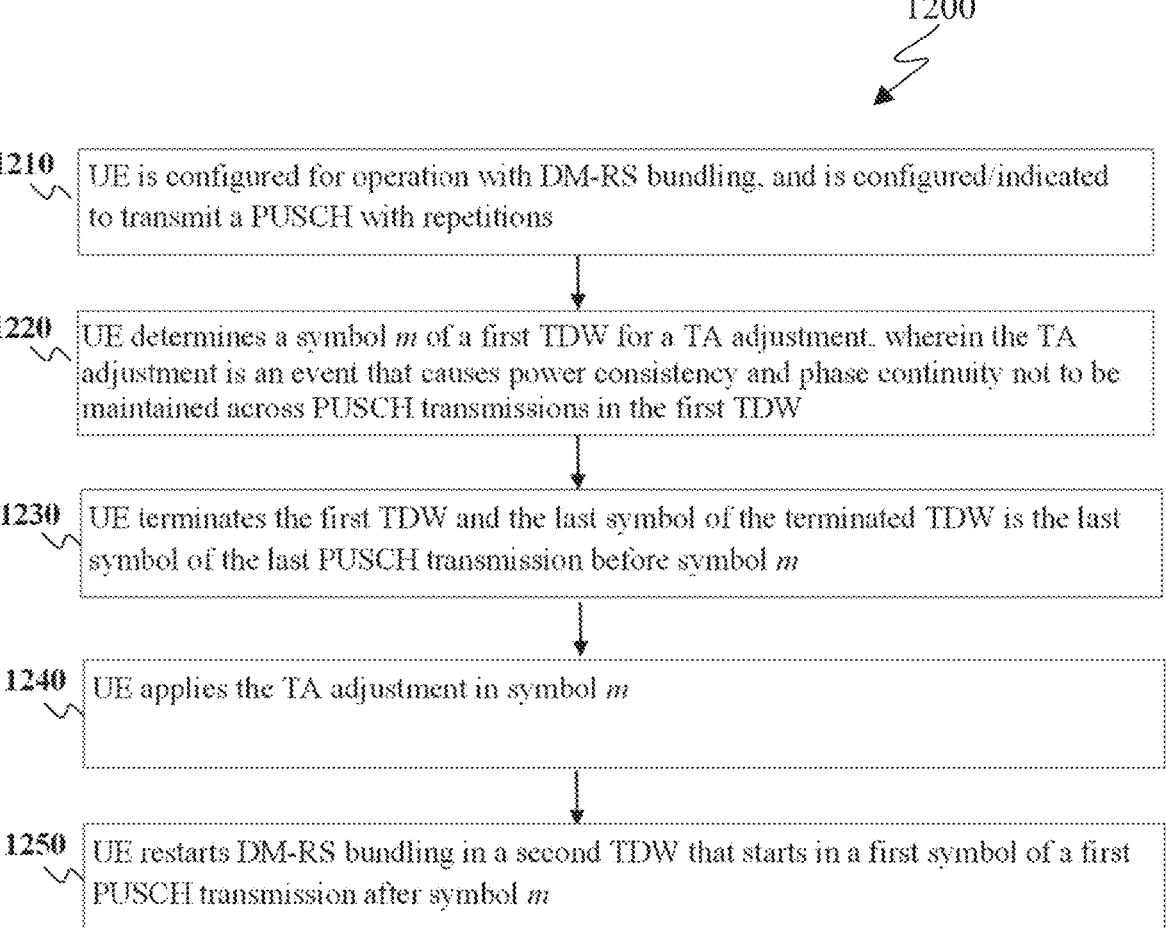

1210 UE is configured for operation with DM-RS bundling, and is configured/indicated to transmit a PUSCH with repetitions 1220 UE determines a symbol *m* of a first TDW for a TA adjustment, wherein the TA adjustment is an event that causes power consistency and phase continuity not to be maintained across PUSCH transmissions in the first TDW 1230 UE terminates the first TDW and the last symbol of the terminated TDW is the last symbol of the last PUSCH transmission before symbol *m*

1240 UE applies the TA adjustment in symbol *m*

1250 UE restarts DM-RS bundling in a second TDW that starts in a first symbol of a first PUSCH transmission after symbol *m*

FIG. 12

1300

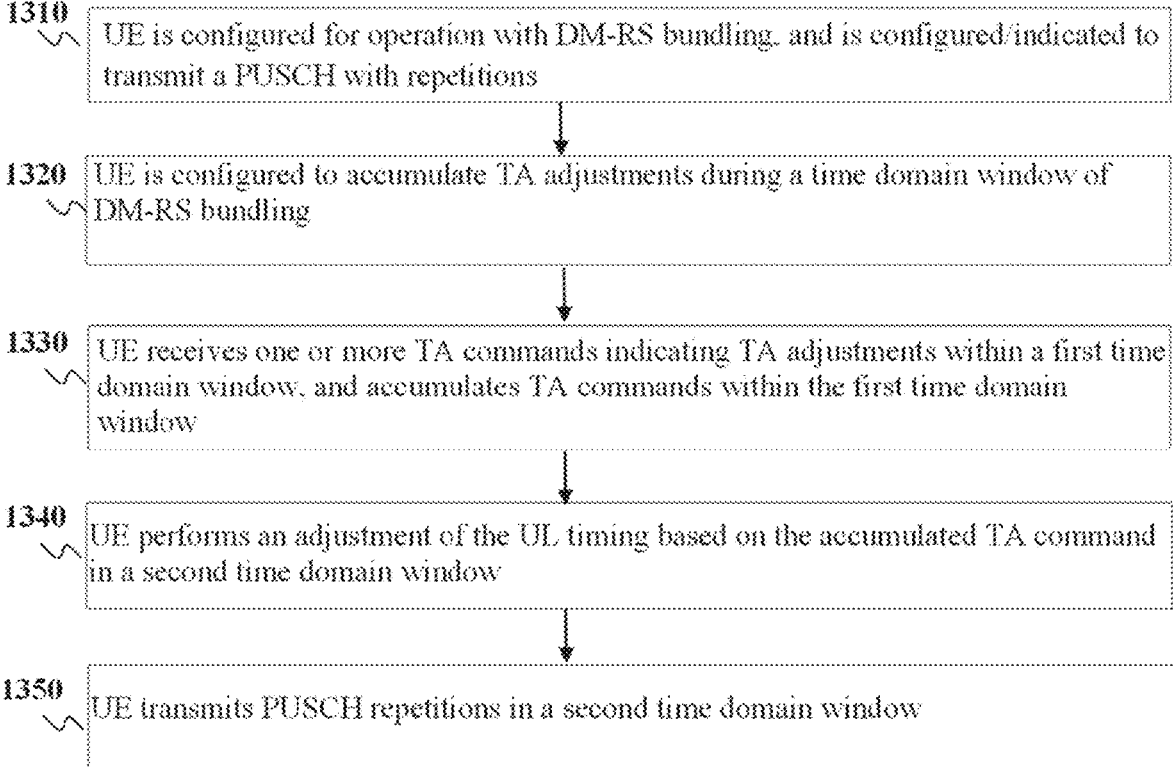

1310 UE is configured for operation with DM-RS bundling, and is configured/indicated to transmit a PUSCH with repetitions

1320 UE is configured to accumulate TA adjustments during a time domain window of DM-RS bundling

1330 UE receives one or more TA commands indicating TA adjustments within a first time domain window, and accumulates TA commands within the first time domain window

1340 UE performs an adjustment of the UL timing based on the accumulated TA command in a second time domain window

1350 UE transmits PUSCH repetitions in a second time domain window

FIG. 13

1400

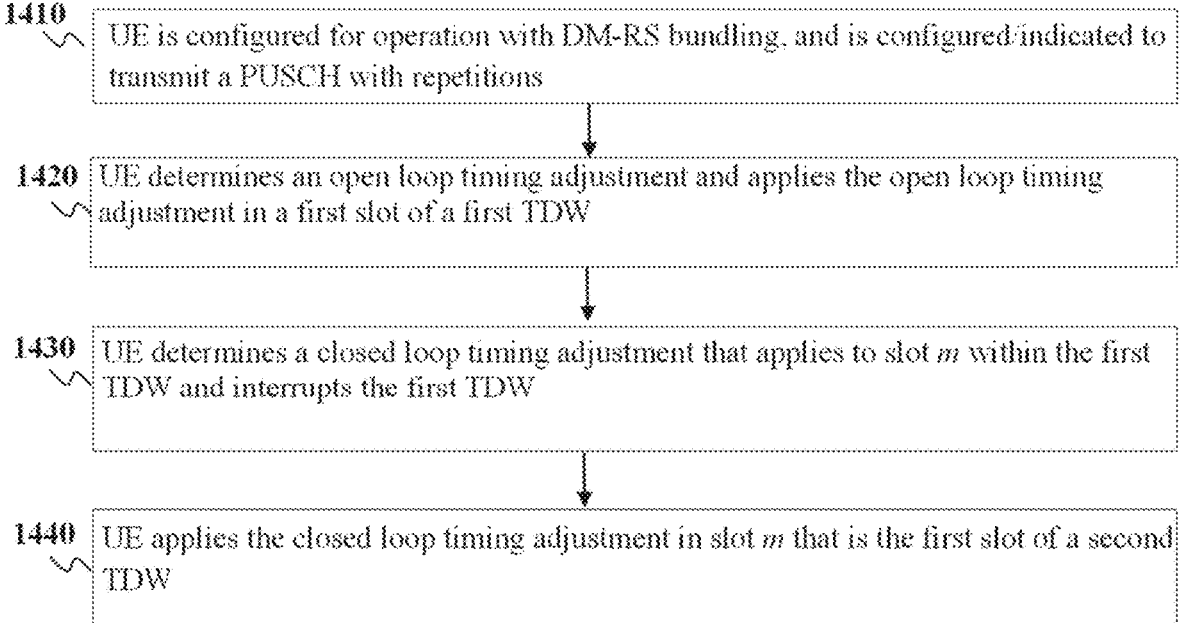

1410  UE is configured for operation with DM-RS bundling, and is configured/indicated to transmit a PUSCH with repetitions 1420  UE determines an open loop timing adjustment and applies the open loop timing adjustment in a first slot of a first TDW 1430  UE determines a closed loop timing adjustment that applies to slot $m$ within the first TDW and interrupts the first TDW 1440  UE applies the closed loop timing adjustment in slot $m$ that is the first slot of a second TDW

FIG. 14

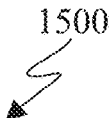
1500
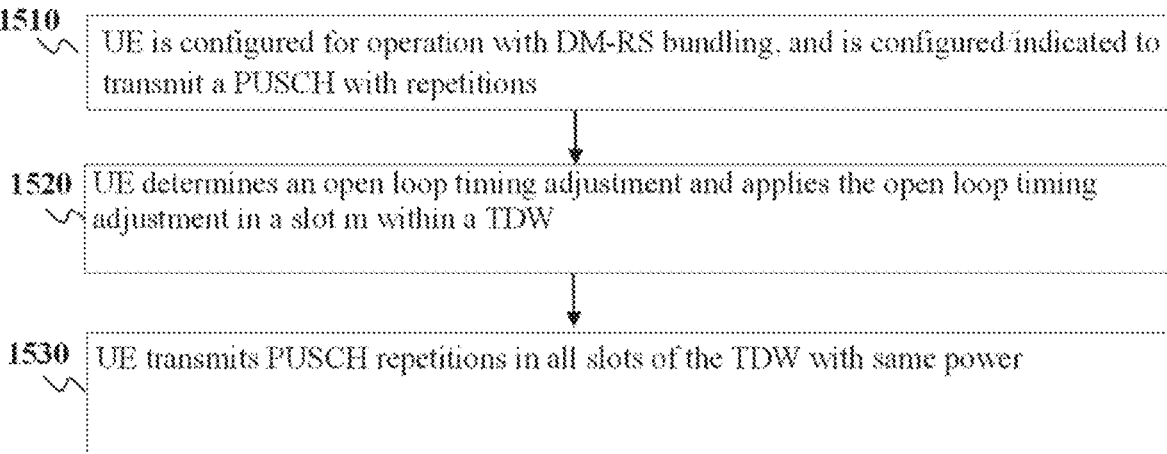
1510 UE is configured for operation with DM-RS bundling, and is configured/indicated to transmit a PUSCH with repetitions
1520 UE determines an open loop timing adjustment and applies the open loop timing adjustment in a slot m within a TDW
1530 UE transmits PUSCH repetitions in all slots of the TDW with same power
FIG. 15

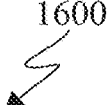

1600

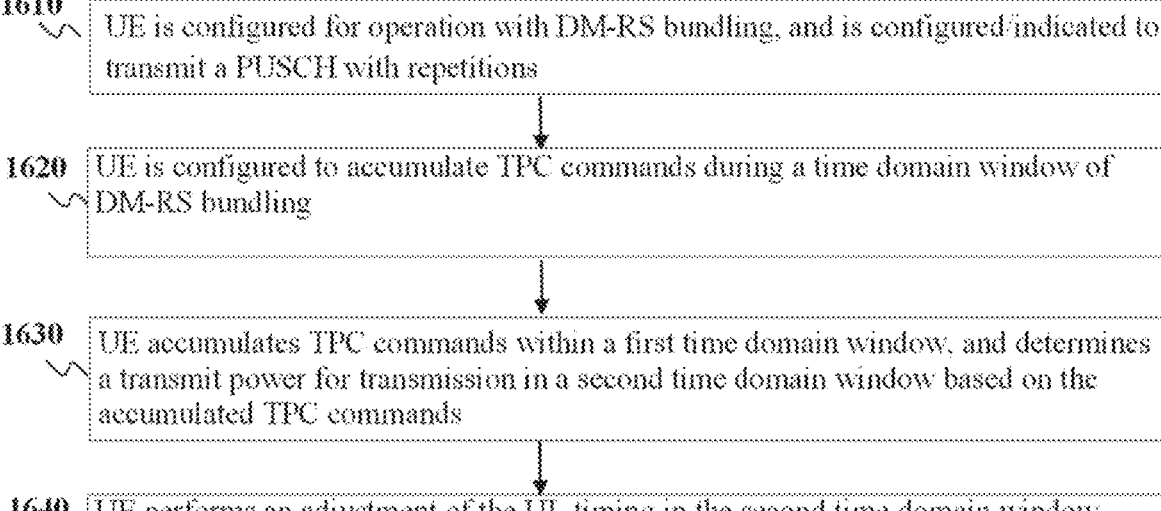

1610 UE is configured for operation with DM-RS bundling, and is configured/indicated to transmit a PUSCH with repetitions

1620 UE is configured to accumulate TPC commands during a time domain window of DM-RS bundling

1630 UE accumulates TPC commands within a first time domain window, and determines a transmit power for transmission in a second time domain window based on the accumulated TPC commands

1640 UE performs an adjustment of the UL timing in the second time domain window based on a single TA command, wherein the corresponding timing of TA adjustment is during the first time domain window

1650 UE transmits PUSCH repetitions with the determined transmit power in the second time domain window after the TA adjustment

FIG. 16

1700

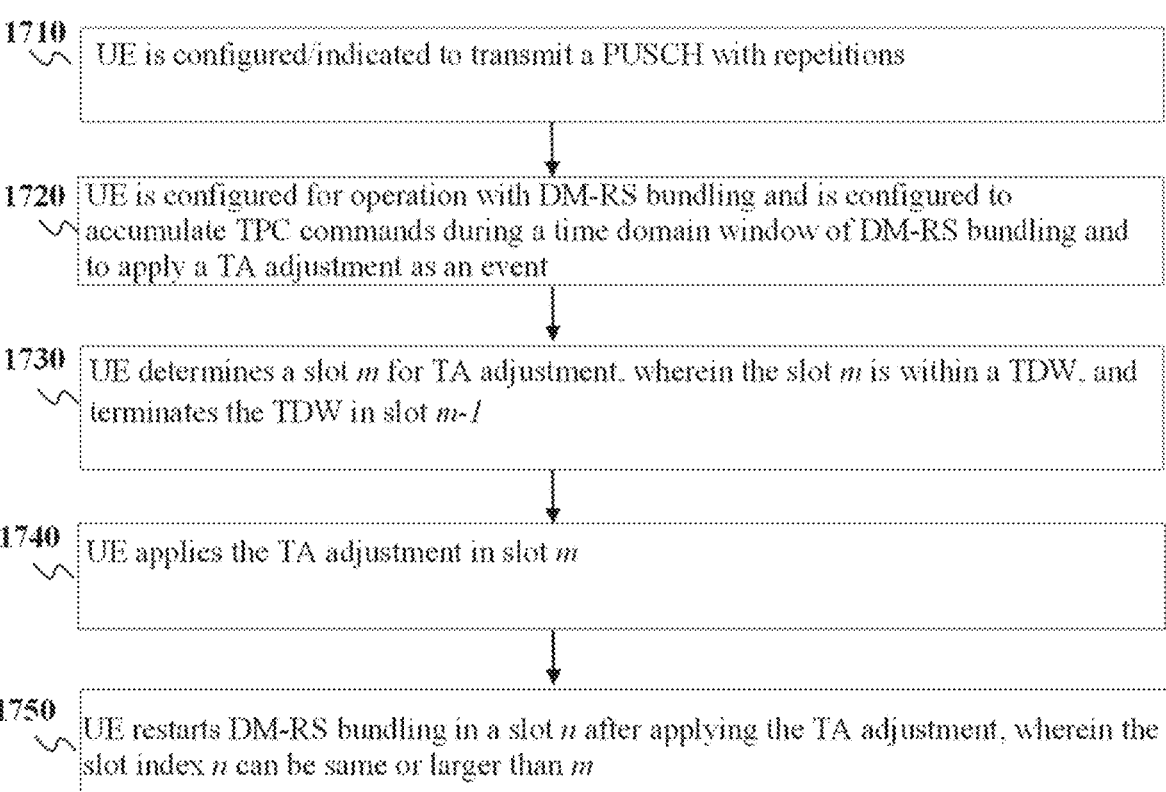

1710  UE is configured/indicated to transmit a PUSCH with repetitions

1720  UE is configured for operation with DM-RS bundling and is configured to accumulate TPC commands during a time domain window of DM-RS bundling and to apply a TA adjustment as an event 1730  UE determines a slot *m* for TA adjustment, wherein the slot *m* is within a TDW, and terminates the TDW in slot *m-1*

1740  UE applies the TA adjustment in slot *m*

1750  UE restarts DM-RS bundling in a slot *n* after applying the TA adjustment, wherein the slot index *n* can be same or larger than *m*

FIG. 17

METHOD AND APPARATUS FOR TIMING ADVANCE ADJUSTMENT

CROSS-REFERENCE TO RELATED APPLICATION AND CLAIM OF PRIORITY

This application claims priority under 35 U.S.C. § 119(e) to U.S. Provisional Patent Application No. 63/270,885 filed on Oct. 22, 2021, and U.S. Provisional Patent Application No. 63/279,939 filed on Nov. 16, 2021. The above-identified provisional patent applications are hereby incorporated by reference in their entireties.

TECHNICAL FIELD

The present disclosure relates generally to wireless communication systems and, more specifically, the present disclosure relates to an apparatus and method for timing advance (TA) adjustment.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to an apparatus and method for TA adjustment.

In one embodiment, a user equipment (UE) is provided. The UE includes a transceiver configured to receive first information indicating use of same power and continuous phase for transmission of a channel over a number of slots and second information indicating a first TA value. The UE further includes a processor operably coupled to the transceiver. The processor is configured to determine a first slot of the number of slots based on the second information, a second slot for adjusting a time for the transmission of the channel based on the first TA value, a first power for the transmission of the channel in slots before the second slot, and a second power for the transmission of the channel in slots starting from the second slot. The transceiver is further configured to transmit the channel with a first power in slots before the second slot and transmit the channel with a second power in slots starting from the second slot with the time for the transmission of the channel in the second slot adjusted based on the first TA value.

In another embodiment, a base station (BS) is provided. The BS includes a transceiver configured to transmit first information indicating use of same power and continuous phase for reception of a channel over a number of slots and second information indicating a first TA value. The BS further includes a processor operably coupled to the transceiver. The processor is configured to determine a first slot of the number of slots based on the second information, a second slot for adjusting a time for the reception of the channel based on the first TA value, a first power for the reception of the channel in slots before the second slots, and a second power for the reception of the channel in slots starting from the second slot. The transceiver is further configured to receive the channel with a first power in slots before the second slot and receive the channel with a second power in slots starting from the second slot with the time for the reception of the channel in the second slot adjusted based on the first TA value.

In yet another embodiment, a method is provided. The method includes receiving first information indicating use of same power and continuous phase for transmission of a channel over a number of slots and second information indicating a first TA value. The method includes determining a first slot of the number of slots based on the second information, a second slot for adjusting a time for the transmission of the channel based on the first TA value, a first power for the transmission of the channel in slots before the second slots, and a second power for the transmission of the channel in slots starting from the second slot. The method further includes adjusting the time for the transmission of the channel in the second slot based on the first TA value and transmitting the channel with a first power in slots before the second slot and with a second power in slots starting from the second slot.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates an example method for a UE to determine a slot where to apply a TA adjustment based on a nominal time domain window according to embodiments of the present disclosure;

FIG. 10 illustrates an example method for a UE to determine a slot where to apply a TA adjustment based on an actual time domain window according to embodiments of the present disclosure;

FIG. 11 illustrates an example method for a UE that terminates a TDW for DM-RS bundling in order to apply a TA adjustment according to embodiments of the present disclosure;

FIG. 12 illustrates another example method for a UE that terminates a TDW for DM-RS bundling in order to apply a TA adjustment according to embodiments of the present disclosure;

FIG. 13 illustrates an example method for a UE to calculate a TA adjustment during a second time window using TA commands received during a first time window according to embodiments of the present disclosure;

FIG. 14 illustrates an example method for a UE to apply an open loop timing adjustment in a first slot of a first TDW

Figure 1:
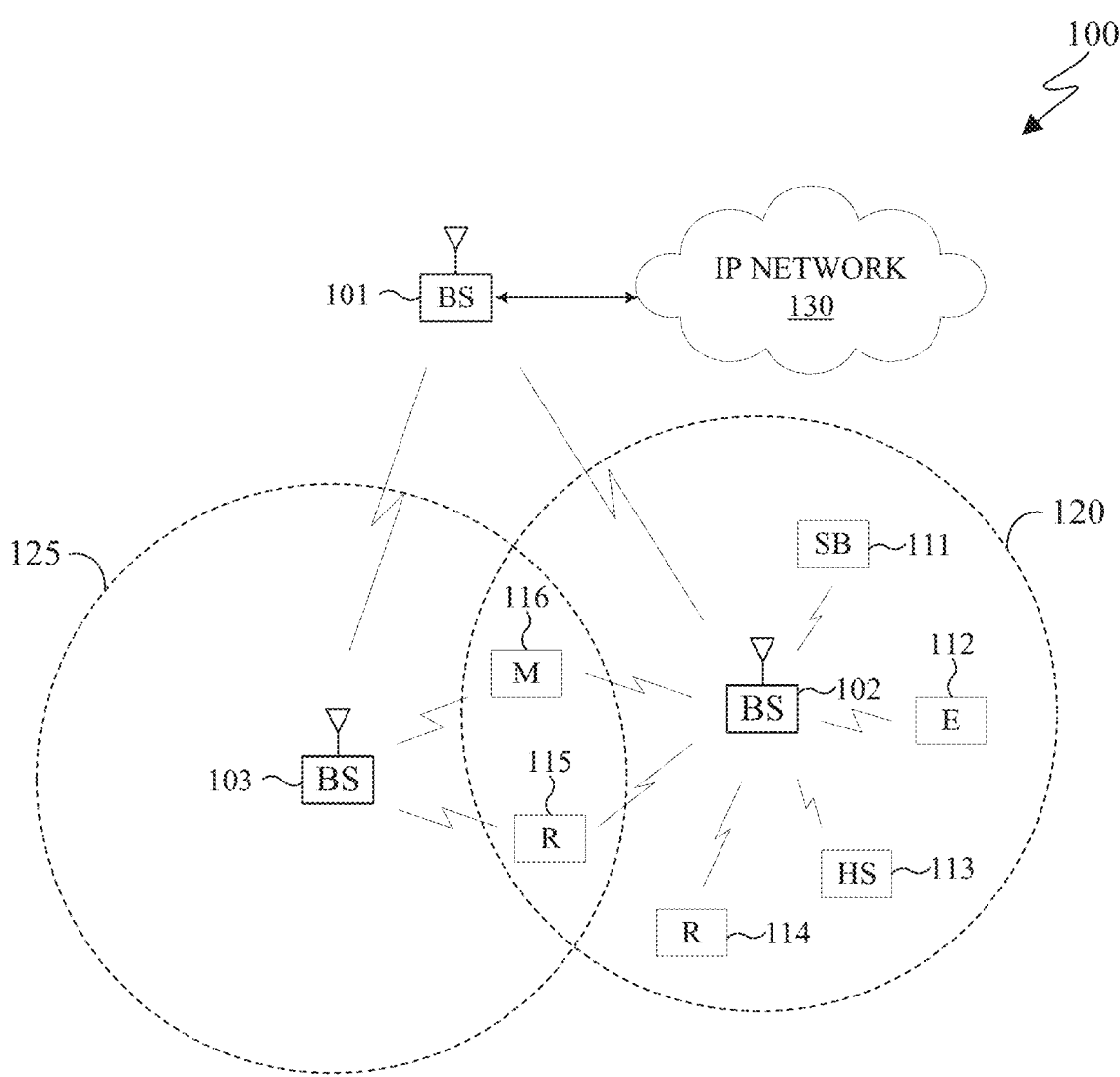
FIG. 1 illustrates an example wireless network according to embodiments of the present disclosure.

4 and apply a closed loop timing adjustment based on a TA command that interrupts the first TDW according to embodiments of the present disclosure;

FIG. 15 illustrates an example method for a UE to apply an open loop timing adjustment in a slot of a TDW according to embodiments of the present disclosure;

FIG. 16 illustrates an example method for a UE to determine a transmit power based on accumulated TPC commands and determine a TA adjustment based on a single TA command according to embodiments of the present disclosure; and FIG. 17 illustrates an example method for a UE to determine a transmit power based on accumulated TPC commands and to terminate a DM-RS bundling TDW to apply a TA adjustment according to embodiments of the present disclosure.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.3.0, "NR; Physical channels and modulation" ("REF1"); 3GPP TS 38.212 v17.3.0, "NR; Multiplexing and channel coding" ("REF2"); 3GPP TS 38.213 v17.3.0, "NR; Physical layer procedures for control" ("REF3"); 3GPP TS 38.214 v17.3.0, "NR; Physical layer procedures for data" ("REF4"); 3GPP TS 38.321 v17.2.0, "NR; Medium Access Control (MAC) protocol specification" ("REF5"); and 3GPP TS 38.331 v17.2.0, "NR; Radio Resource Control (RRC) protocol specification" ("REF6").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long-term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
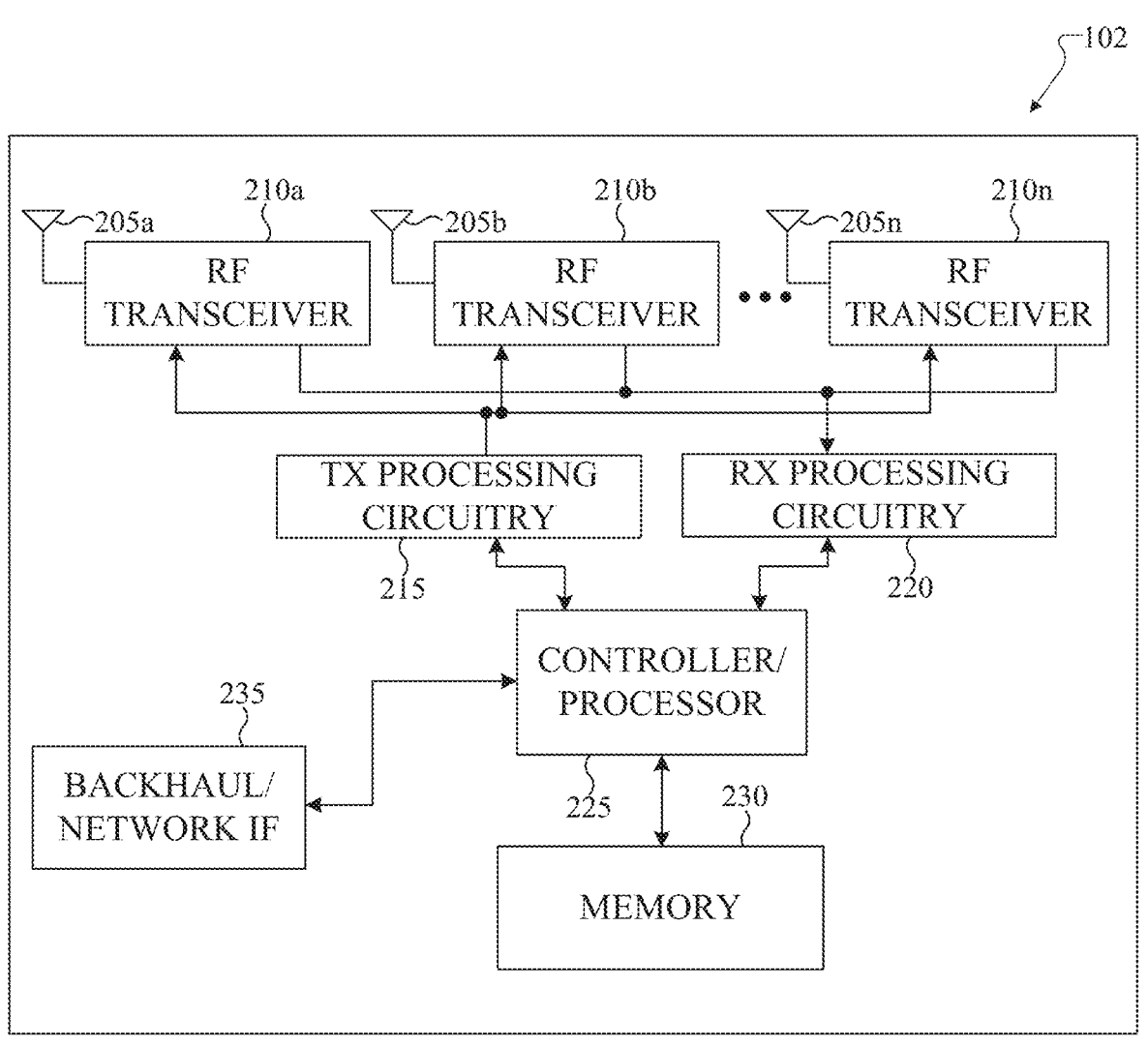
FIG. 2 illustrates an example base station (BS) according to embodiments of the present disclosure.
Figure 3:
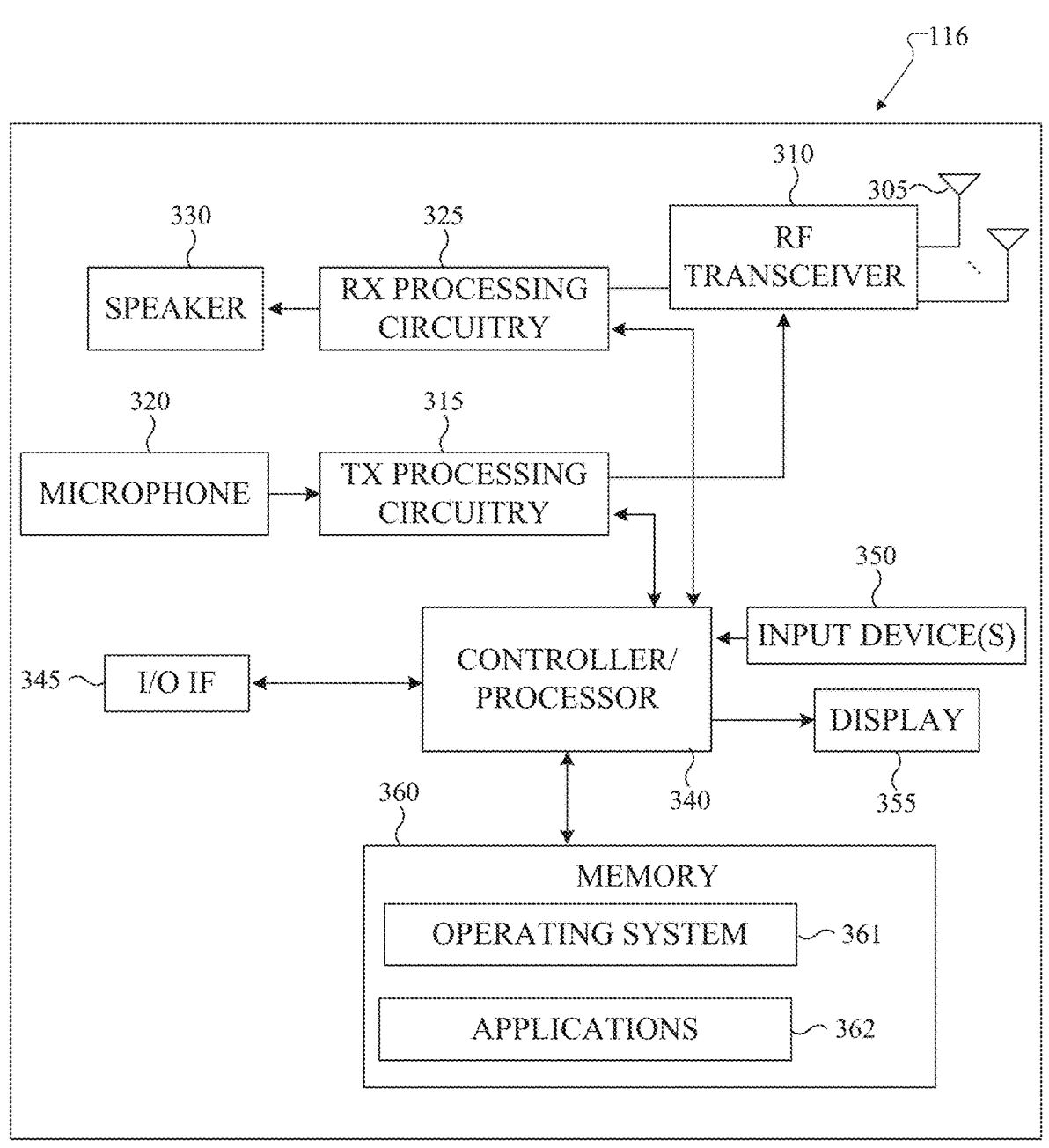
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, LTE, long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for timing advance adjustment. In certain embodiments, and one or more of the BSs 101-103 includes circuitry, programing, or a combination thereof for triggering methods for cell-specific or UE-group-specific adaptation for network energy savings.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support timing advance adjustment. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
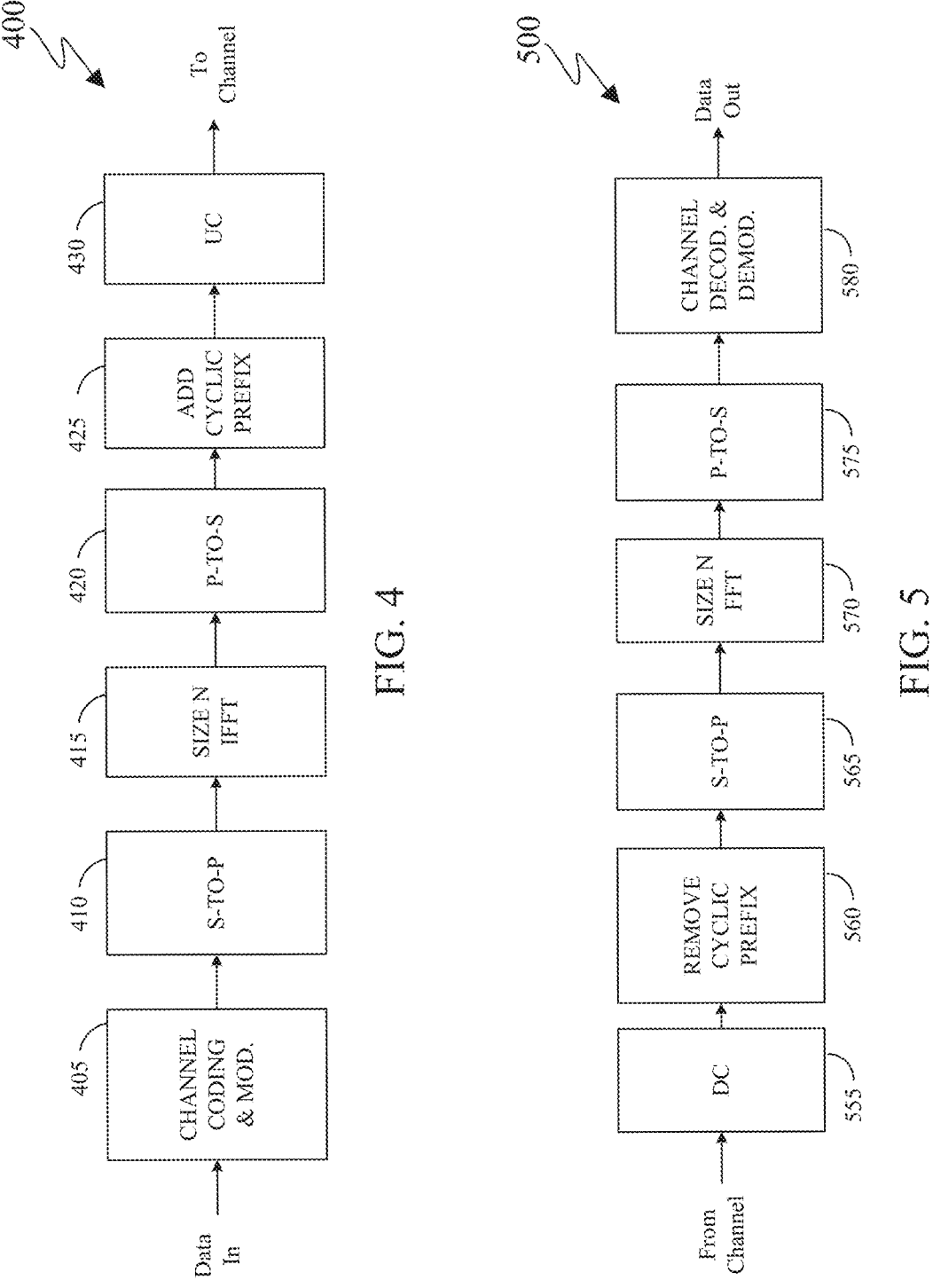
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support triggering methods for cell-specific or UE-group-specific adaptation for network energy savings as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Uplink timing is adjusted in order to align uplink and downlink frames at a gNB. During initial access, a UE transmits a random-access preamble and the gNB estimates a transmission timing correction for the UE and sends a Timing Advance (TA) command in a Random-Access Response (RAR) message. Then the UE makes an adjustment in the transmit timing. When the UE is in connected mode, the gNB estimates the TA and sends a timing advance command MAC CE to the UE, if a correction is required.

To maintain UL time alignment, a gNB can configure a timeAlignmentTimer parameter per Timing Advance Group (TAG) that controls how long the MAC entity considers the serving cells belonging to the associated TAG to be uplink time aligned. When a timing advance command MAC CE is received, and if an $N_{TA}$, which is a timing advance between downlink and uplink, has been maintained with the indicated TAG, the MAC entity applies the timing advance command for the indicated TAG, and starts or restarts the timeAlignmentTimer associated with the indicated TAG.

When a TA command is received in a Random Access Response (RAR) message for a serving cell belonging to a TAG or in a MsgB for an SpCell: if the RA preamble was not selected by the MAC entity among the contention-based RA preamble, the MAC entity applies the timing advance command for this TAG and starts or restarts the timeAlignmentTimer associated with this TAG; else if the timeAlignmentTimer associated with this TAG is not running, the MAC identity applies the TA command for this TAG, starts the timeAlignmentTimer associated with this TAG, and when the contention resolution is considered not successful or when the contention resolution is considered successful for SI request, after transmitting HARQ feedback for MAC PDU including UE contention resolution identity MAC CE, the MAC identity stops timeAlignmentTimer associated with this TAG; else the MAC identity ignores the received timing advance command.

When an absolute timing advance command is received in response to a MsgA transmission including C-RNTI MAC CE, the MAC identity applies the timing advance command for the PTAG and starts or restarts the timeAlignmentTimer associated with PTAG.

When a timeAlignmentTimer expires and the timeAlignmentTimer is associated with the PTAG, the MAC identity flushes all HARQ buffers for all serving cells, notifies the RRC to release the PUCCH for all serving cells, if configured, notifies the RRC to release the SRS for all serving cells, if configured, clears any configured downlink assignments and configured uplink grants, clears any PUSCH resource for semi-persistent CSI reporting, considers all running timeAlignmentTimers as expired, and maintains $N_{TA}$ of all TAGs. When a timeAlignmentTimer expires and the timeAlignmentTimer is associated with a Secondary Timing Advance Group (STAG), for all serving cells belonging to this TAG, the MAC identity flushes all HARQ buffers, notifies the RRC to release the PUCCH, if configured, notifies the RRC to release the SRS, if configured, clears any configured downlink assignments and configured uplink grants, clears any PUSCH resource for semi-persistent CSI reporting, and maintains $N_{TA}$ of this TAG.

When a UE receives a timing advance command for a TAG, the UE adjusts uplink timing for PUSCH/SRS/PUCCH transmission on all the serving cells in the TAG based on a value of the timing advance offset $N_{TA,offset}$ that the UE expects to be the same for all the serving cells in the TAG and based on the received timing advance command where the uplink timing for PUSCH/SRS/PUCCH transmissions is the same for all the serving cells in the TAG. The UE can be provided the value $N_{TA,offset}$ of the timing advance offset and, if not provided, the UE determines a default value. The timing advance command $T_A$ for a TAG indicates the change of the uplink timing relative to the current uplink timing for the TAG. In case of random-access response or in an absolute timing advance command MAC CE, the timing advance command $T_A$ indicates a value $N_{TA}$ that is relative to the SCS of the first uplink transmission from the UE after the reception of the random-access response or absolute timing advance command MAC CE.

A UE includes a demodulation reference signal (DM-RS) in a physical uplink data channel (PUSCH) or in a physical uplink control channel (PUCCH) transmission in order to enable a receiver at a serving gNB to coherently demodulate modulated data information symbols or control information symbols in the PUSCH or in the PUCCH. The DM-RS is typically located in the earlier symbols of a PUSCH or PUCCH transmission to avoid a demodulation delay due to a processing time for obtaining a channel estimate to be used for the coherent demodulation of data/control symbols under the assumption of phase coherence among the DM-RS and the data/control symbols. To improve an accuracy of channel estimates multiple DM-RS across repetitions of a PUSCH or PUCCH transmission are filtered, and to enable filtering over multiple DM-RS, a power and phase of the filtered DM-RS needs to remain constant and that also applies to the power and phase of modulated data/control information symbols in order to perform demodulation using the filtered DM-RS. Throughout this disclosure the operation of DM-RS filtering over a number of slots or symbols is also referred as DM-RS bundling.

When a UE receives a timing advance command on uplink slot n and for a transmission other than a PUSCH scheduled by a RAR UL grant or a fallbackRAR UL grant, or a PUCCH with HARQ-ACK information in response to a successRAR, the corresponding adjustment of the uplink transmission timing applies from the beginning of uplink slot m=n+k+1 where k depends on the timing advance command provided by a TA command field, and on other factors as PDSCH processing time, preparation time for PUSCH transmission, number of slots per subframe, subframe duration and SCS. Since an application of the timing adjustment to a PUSCH/PUCCH/SRS transmission in slot m causes a phase discontinuity, timing adjustment cannot be applied during the time period when DM-RS bundling is applied. Thus, there is a need to determine when to apply a timing adjustment provided by a timing advance command when DM-RS bundling is also applied.

To maintain a phase continuity for a transmission with DM-RS bundling during a TDW, a timing adjustment can be applied in a slot after the TDW or in a slot within the TDW causing the TDW to be interrupted. It is also possible that the timing adjustment is applied within the TDW without causing an interruption of the TDW if additional conditions are satisfied.

The present disclosure relates to applying a timing adjustment provided by a timing advance command for a PUSCH/PUCCH/SRS transmission when DM-RS bundling is also applied. The present disclosure also relates to applying the timing adjustment based on a common adjustment value indicated by a gNB and on an additional timing adjustment value estimated by a UE. The present disclosure further relates to determining a slot for applying the timing adjustment and a power for the PUSCH/PUCCH/SRS transmission in slots starting from the slot where the timing adjustment is applied.

Throughout this disclosure, the operation of DM-RS bundling is described for processing modulated data of a PUSCH using channel estimates that the gNB receiver obtains by filtering a number of DM-RS, and equally applies for processing of control information symbols of a PUCCH or SRS symbols.

An operation of DM-RS bundling over a number of slots can be for processing PUSCH repetitions of a same TB in each repetition, or PUSCH transmissions of different TBs, or also PUSCH transmission of a single TB over multiple slots, or a combination of the above. For a PUCCH transmission with repetitions, a same control information can be provided in each repetition, or different control information can be provided in some repetitions, or same control information can be encoded and mapped to resource elements over multiple repetitions. It is possible that a slot includes one or more repetitions, and consecutive repetitions in a same slot or in different slots can be separated by one or more symbols, with the one or more symbols used for other uplink transmission(s) or downlink reception(s). The operation of DM-RS bundling can be applied to a non-terrestrial network (NTN) for which ensuring a reception reliability for UL channels is particularly challenging due to the limited link-budget associated with a larger path-loss.

An NTN is a network using RF resources on board satellites or uncrewed aerial service (UAS) platforms. An NTN includes satellites that can be Geostationary Earth Orbiting (GEO) satellites served by one or several sat-gateways that are deployed across the satellites targeted coverage or Low Earth Orbit (LEO) satellites served successively by one or several satellite-gateways at a time, a radio link between a sat-gateway and the satellite or UAS platform, a radio link between the UE and the satellite or UAS platform. A satellite or UAS platform may implement either a transparent or a regenerative (with on board processing) payload. The satellite or UAS platform typically generates several beams over a given service area bounded by its field of view which depends on the on-board antenna diagram and elevation angle. The footprint of a beam has an elliptic shape and is considered as a cell in terrestrial networks.

Throughout this disclosure, a PUSCH transmission with repetitions can be dynamically scheduled by an UL grant in a DCI, or the transmission can correspond to a configured grant Type 1 PUSCH transmission, wherein the configured grant Type 1 PUSCH transmission can be semi-statically configured to operate upon the reception of higher layer parameter of configuredGrantConfig including rrc-ConfiguredUplinkGrant without the detection of an UL grant in a DCI, or the transmission can correspond to a configured grant Type 2 PUSCH transmission, wherein the configured grant Type 2 PUSCH transmission can be semi-persistently scheduled by an UL grant in a valid activation DCI after the reception of higher layer parameter configuredGrantConfig not including rrc-ConfiguredUplinkGrant. A PUCCH transmission with repetitions can be dynamically scheduled or semi-statically configured by higher layers.

When a gNB configures a UE for operation with DM-RS bundling, the gNB can also configure a time domain window (TDW) length L as a number of slots or symbols or repetitions, over which the UE applies conditions that result to a same phase and a same power for the transmission during such time duration. It is also possible that the gNB does not provide a value for the length L and the UE determines the length of the time domain window based on a UE capability, for example the UE capability of a maximum length of a time domain window for DM-RS bundling, and/or on a configuration, for example the configuration of frequency hopping that provides a duration of a frequency hop, and/or on a dynamic indication wherein the dynamic indication can enable/disable DM-RS bundling or provide the time domain window length. Even when L is configured, the UE can determine a length of the time domain window smaller than L based on a UE capability and/or on a configuration and/or on a dynamic indication. When the UE receives a timing advance command and the slot where the corresponding uplink timing adjustment should be done based on the timing relationship for TA command reception is within a time domain window for DM-RS bundling, the UE needs to defer the application of the timing adjustment to a slot that is after the time domain window. Alternatively, the UE can early terminate DM-RS bundling and apply the timing advance adjustment in the corresponding slot based on the timing relationship for TA command reception in 3GPP TS 38.211 Clause 4.3 and 3GPP TS 38.214 Clause 4.2.

To achieve uplink time synchronization so that UL and DL frames are aligned at a gNB, in a NTN with transparent satellite payload, a UE needs to compensate for a large and time-varying propagation delay by applying a timing adjust-ment that can include an open loop component in addition to a closed loop component that is a timing adjustment in response to a TA command.

Throughout this disclosure we refer to a time domain window with a length L determined by the UE as a config-ured TDW or a nominal TDW, wherein the length L can be based on one method, or a combination of the methods described above and the gNB may or may not configure a value of the time domain window length when DM-RS bundling is configured. A nominal TDW can consist of one or multiple actual TDWs within which the UE is expected to maintain power consistency and phase continuity across PUSCH transmissions of PUSCH repetition, or across TB processing over multiple slots, or across PUCCH transmissions of PUCCH repetition.

When a UE receives a timing advance command in a slot n, the corresponding timing adjustment of the uplink trans-mission timing should be applied from the beginning of the uplink slot $m=n+k+1$. If the slot m is within a time domain window for DM-RS bundling, the UE can postpone the timing adjustment to the slot after the last slot of the time domain window for DM-RS bundling that includes slot m. It is also possible that the UE terminates the time domain window in slot $m-1$ and applies the timing adjustment in slot m. The application of the TA adjustment value, or TA adjustment or TA value, in slot m is an event that causes power consistency and phase continuity not to be maintained across PUSCH transmissions of PUSCH repetition, or across TB processing over multiple slots, or across PUCCH transmissions of PUCCH repetition.

Figure 6:
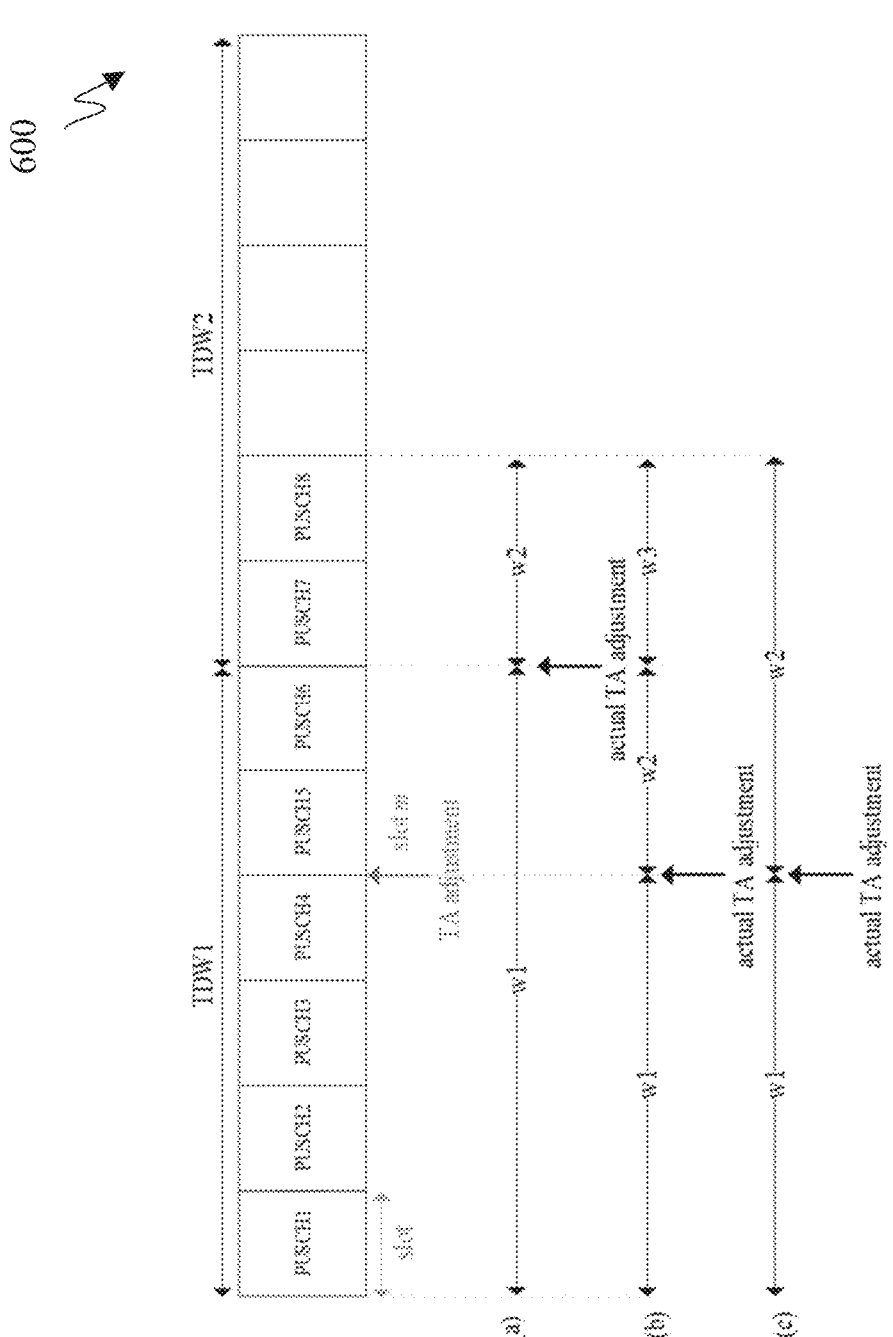
FIG. 6 illustrates an example of a TA command reception with a corresponding TA adjustment in a slot m within a nominal time domain window TDW1 according to embodiments of the present disclosure.

FIG. 6 illustrates an example of a TA command reception 600 with a corresponding TA adjustment in a slot m within a nominal time domain window TDW1 according to embodiments of the present disclosure. The embodiment of the TA command reception 600 with a corresponding TA adjustment in a slot m within a nominal time domain window TDW1 illustrated in FIG. 6 is for illustration only. FIG. 6 does not limit the scope of this disclosure to any particular implementation of the TA command reception 600 with a corresponding TA adjustment in a slot m within a nominal time domain window TDW1.

In the example illustrated in FIG. 6, the UE is configured/indicated to transmit a PUSCH with repetitions Type A and the number of repetitions is 8. The UE is also configured for a DM-RS bundling operation and is provided a time domain window length equal to 6.

In example (a) of FIG. 6, the DM-RS bundling operation in TDW1 is not interrupted to apply the TA adjustment. The UE postpones the application of the TA adjustment to the boundary of the nominal time domain window TDW1 and applies the TA adjustment in a slot after the last slot of the time domain window that includes slot m. The slot where the TA adjustment is applied can be the first slot of the next time domain window and can be a consecutive or non-consecutive slot of the last slot of the previous time domain window. It is also possible that the time domain window that includes slot m is the last time domain window and the TA adjustment is applied in a first slot of a next uplink transmission without DM-RS bundling.

In example (b) of FIG. 6, the UE applies the TA adjustment in slot m. In order to apply the TA adjustment in slot m the UE terminates DM-RS bundling in slot m−1. After applying the TA adjustment, the UE restarts the DM-RS bundling operation over the remaining slots within the nominal TDW1. The UE applies DM-RS bundling in a first actual window w1, applies the timing adjustment according to the timing relationship of the TA command reception in slot m and applies DM-RS bundling in a second actual window w2. The third actual window w3 is not affected by the TA adjustment. Thus, the TA adjustment impacts the DM-RS bundling operation by interrupting the DM-RS operation in a nominal or actual time domain window.

In example (c) of FIG. 6, the UE terminates DM-RS bundling in slot m−1 and applies the TA adjustment in m. After applying the TA adjustment, the UE restarts the DM-RS bundling operation over a time domain window of length up to the maximum configured length. In the example, the remaining number of repetitions is smaller than the configured length, and the time domain window w2 has a length of 4 slots.

It is possible that the actual time domain window that includes slot m terminates before the end of the nominal TDW1. This can be due to an unavailability of one or more slots for uplink transmission, or to the transmission of a higher priority uplink channel, or to a cancellation indication. Then the UE applies the TA adjustment in the first slot with an uplink transmission after termination of the actual time domain window.

Figure 7:
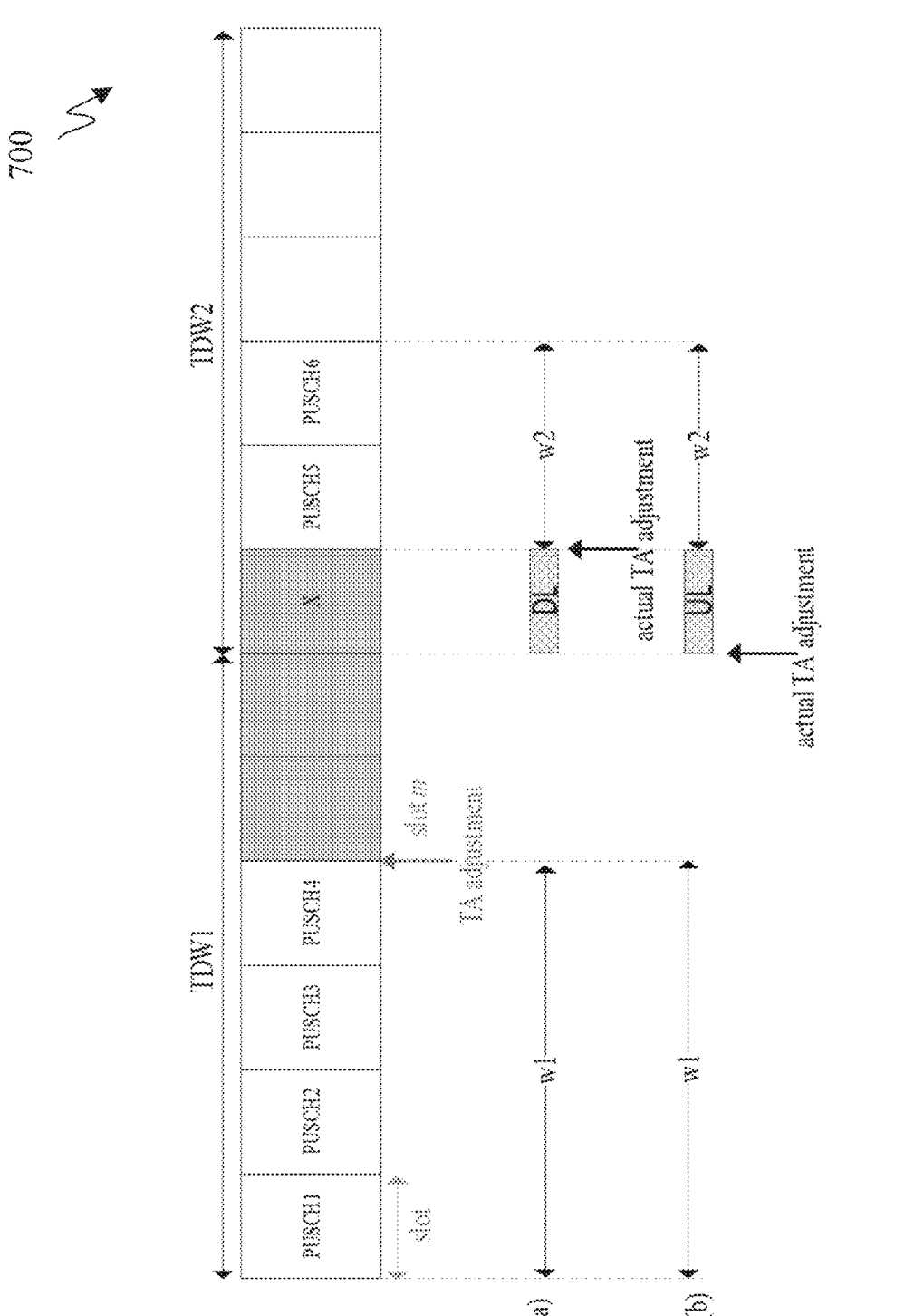
FIG. 7 illustrates an example of a TA command reception with a corresponding TA adjustment in a slot within a TDW1 according to embodiments of the present disclosure.

FIG. 7 illustrates an example of a TA command reception 700 with a corresponding TA adjustment in a slot within a TDW1 according to embodiments of the present disclosure. The embodiment of the TA command reception 700 with a corresponding TA adjustment in a slot within a TDW1 illustrated in FIG. 7 is for illustration only. FIG. 7 does not limit the scope of this disclosure to any particular implementation of the TA command reception 700 with a corresponding TA adjustment in a slot within a TDW1.

As illustrated in FIG. 7, the UE is configured/indicated to transmit a PUSCH with repetitions Type A and the number of repetitions is 6. The UE is also configured for a DM-RS bundling operation and is provided a time domain window length equal to 6. Slots 5 to 7 are unavailable for UL transmission and UE transmits the remaining repetitions in a new time domain window w2 starting from slot 8. In a first example (a), slot 7 is a DL slot and the TA adjustment is applied at the beginning of slot 8. In a second example (b), slot 7 is an UL slot used for the transmission of another UL transmission, and the TA adjustment is applied at the beginning of slot 7.

Figure 8:
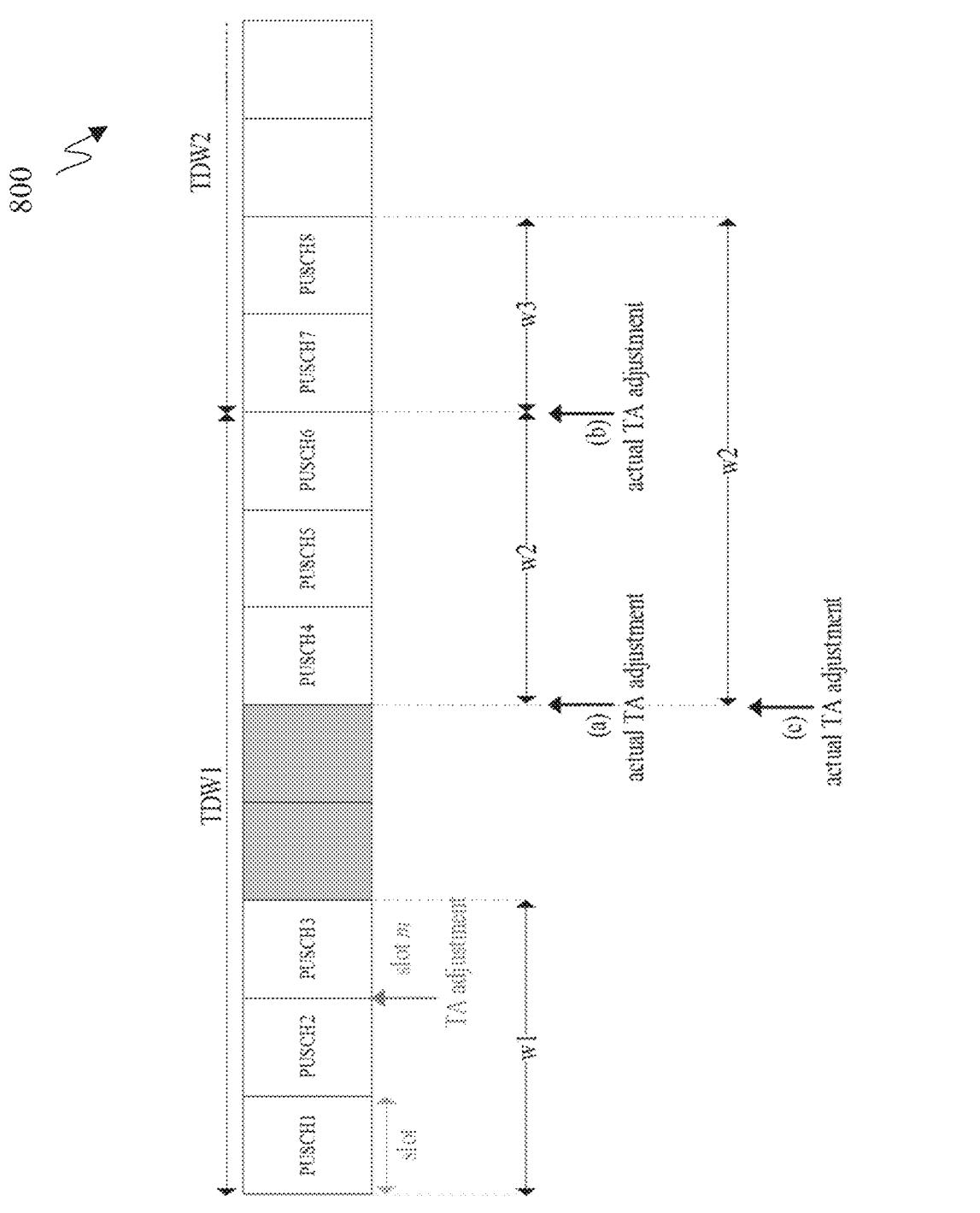
FIG. 8 illustrates another example of a TA command reception with a corresponding TA adjustment in a slot within a TDW1 according to embodiments of the present disclosure.

FIG. 8 illustrates example of a TA command reception 800 with a corresponding TA adjustment in a slot within a TDW1 according to embodiments of the present disclosure. The embodiment of the TA command reception 800 with a corresponding TA adjustment in a slot within a TDW1 illustrated in FIG. 8 is for illustration only. FIG. 8 does not limit the scope of this disclosure to any particular implementation of the TA command reception 800 with a corresponding TA adjustment in a slot within a TDW1.

When a UE receives a timing advance command indicating the TA adjustment within a time domain window and postpones the application of the TA adjustment to a next time domain window, the postponement can be done relative to the nominal time domain window or to the actual time domain window. In the example of FIG. 8, the UE is configured/indicated to transmit a PUSCH with repetitions Type A and the number of repetitions is 8. The UE is also configured for a DM-RS bundling operation and is provided a time domain window length equal to 8. Slots 4 and 5 are unavailable for UL transmission and within the nominal TDW1 the UE performs DM-RS bundling in a first actual time domain window w1 and in a second time domain window w2. The UE receives a TA command indicating the TA adjustment within the nominal TDW1 (and also within the actual time domain window w1) in slot 3 and postpones the application of the TA adjustment to a later slot. In a first embodiment (a) the UE applies the TA adjustment after the actual time domain window w1: the actual TA adjustment is performed in the first slot of the next actual time domain window. In a second embodiment (b) the UE applies the TA adjustment after the nominal time domain window TDW1: the actual TA adjustment is performed in the first slot of the next nominal time domain window TDW2. In a third embodiment (c) the UE is configured to restart the time domain window after the transmission gap that includes slots 4 and 5 and applies the TA adjustment in the first slot of the next actual time domain window.

Whether the UE performs DM-RS bundling after a transmission gap as in embodiment (a) or as in embodiment (b) can be subject to a configuration and/or a UE capability. For example, a UE with a capability of restarting a time domain window after a transmission gap can perform DM-RS bundling after a transmission in a window of length equal to the configured length L. It is also possible that a UE with the capability of restarting a time domain window after a transmission gap can perform DM-RS bundling after a transmission in a window of length equal to the configured length L only if a configuration enables such behavior, otherwise if not enabled, the UE applies DM-RS bundling after a transmission gap in a time domain window within the nominal TDW1 as in embodiment (a) or (b) of FIG. 8.

It is also possible that after a transmission gap within a nominal time domain window, the UE transmits the remaining repetitions after the transmission gap over the slots within the nominal time domain window without performing DM-RS bundling. The UE would perform the TA adjustment in the next slot after the transmission gap with an UL transmission.

Whether a TA adjustment interrupts the DM-RS bundling operation can depend on whether the UL transmission is a dynamic scheduled transmission or is a semi-static configured transmission.

FIG. 9 illustrates an example method 900 for a UE to determine a slot where to apply a TA adjustment based on a nominal time domain window according to embodiments of the present disclosure. The embodiment of the example method 900 for a UE to determine a slot where to apply a TA adjustment based on a nominal time domain window illustrated in FIG. 9 is for illustration only. FIG. 9 does not limit the scope of this disclosure to any particular implementation of the example method 900 for a UE to determine a slot where to apply a TA adjustment based on a nominal time domain window.

As illustrated in FIG. 9, in step 910, a UE is configured for operation with DM-RS bundling and is configured/indicated to transmit a PUSCH with repetitions. In step 920, the UE receives a TA command indicating a TA adjustment in a slot within a first nominal TDW. In step 930, the UE applies the TA adjustment in a first slot of a second nominal TDW, wherein the second nominal TDW is after the first nominal TDW. In step 930, the last slot of the first nominal TDW and the first slot of the second nominal TDW can be consecutive or non-consecutive slots. In step 930, the second nominal TDW can be an actual TDW.

FIG. 10 illustrates an example method 1000 for a UE to determine a slot where to apply a TA adjustment based on an actual time domain window according to embodiments of the present disclosure. The embodiment of the example method 1000 for a UE to determine a slot where to apply a TA adjustment based on an actual time domain window illustrated in FIG. 10 is for illustration only. FIG. 10 does not limit the scope of this disclosure to any particular implementation of the example method 1000 for a UE to determine a slot where to apply a TA adjustment based on an actual time domain window.

As illustrated in FIG. 10, in step 1010, a UE is configured for operation with DM-RS bundling and is configured/indicated to transmit a PUSCH with repetitions. In step 1020, the UE receives a TA command indicating a TA adjustment in a slot within a first actual TDW. In step 1030, the UE applies the TA adjustment in a first slot of a second actual TDW, wherein the second actual TDW is after the first actual TDW. In step 1030, the last slot of the first actual TDW and the first slot of the second actual TDW can be consecutive or non-consecutive slots.

FIG. 11 illustrates an example method 1100 for a UE that terminates a TDW for DM-RS bundling in order to apply a TA adjustment according to embodiments of the present disclosure. The embodiment of the example method 1100 for a UE that terminates a TDW for DM-RS bundling in order to apply a TA adjustment illustrated in FIG. 11 is for illustration only. FIG. 11 does not limit the scope of this disclosure to any particular implementation of the example method 1100 for a UE that terminates a TDW for DM-RS bundling in order to apply a TA adjustment.

As illustrated in FIG. 11, in step 1110, a UE is configured for operation with DM-RS bundling and is configured/indicated to transmit a PUSCH with repetitions. In step 1120, the UE receives a TA command indicating a TA adjustment in a slot in within a first TDW. In step 1130, the UE terminates the first TDW in slot m−1. In step 1140, the UE applies the TA adjustment in slot in and transmits a PUSCH in slot m.

A UE can have a capability of restarting DM-RS bundling after an event that causes power consistency and phase continuity not to be maintained across PUSCH transmissions of PUSCH repetitions across slots before and after the event. When the UE receives a TA command indicating a TA adjustment in a slot within a TDW and a parameter that indicates whether to restart the TDW after the event is enabled, for example PUSCH-Window-Restart is enabled, the UE starts a new TDW after the event.

FIG. 12 illustrates an example method 1200 for a UE that terminates a TDW for DM-RS bundling in order to apply a TA adjustment according to embodiments of the present disclosure. The embodiment of the example method 1200 for a UE that terminates a TDW for DM-RS bundling in order to apply a TA adjustment illustrated in FIG. 12 is for illustration only. FIG. 12 does not limit the scope of this disclosure to any particular implementation of the example method 1200 for a UE that terminates a TDW for DM-RS bundling in order to apply a TA adjustment.

As illustrated in FIG. 12, in step 1210, a UE is configured for operation with DM-RS bundling and is configured/indicated to transmit a PUSCH with repetitions. In step

1220, the UE determines a symbol m of a first TDW for a TA adjustment, wherein the TA adjustment is an event that causes power consistency and phase continuity not to be maintained across PUSCH transmissions in the first TDW. In step 1230, the UE terminates the first TDW and the last symbol of the terminated TDW is the last symbol of the last PUSCH transmission before symbol m. In step 1240, the UE applies the TA adjustment in symbol m. In step 1250, the UE restarts DM-RS bundling in a second TDW that starts in a first symbol of a first PUSCH transmission after symbol m.

When a UE is configured for operation with DM-RS bundling and receives a TA command that indicates a TA adjustment within a TDW, and the UE postpones the application of the TA adjustment in a slot or symbol after the TDW, whether the slot or symbol where the actual TA adjustment is done is determined based on a nominal TDW as in FIG. 9 or based on an actual TDW as in FIG. 10 can be subject to a configuration. It is also possible that the slot or symbol where the actual TA adjustment is done is determined based on a nominal TDW or based on an actual TDW, whichever is first.

When a UE is configured for operation with DM-RS bundling and receives a TA command that indicates a nominal TA adjustment within a TDW, the UE terminates the TDW to apply the TA adjustment. The actual TA adjustment can be applied in the same slot or symbol indicated by the nominal TA adjustment. It is also possible that the actual TA adjustment is postponed of a number of symbols, or of a number of slots, or to the next slot respect to the symbol or slot indicated by the nominal TA adjustment.

In another embodiment a UE receives more than one TA commands that indicate TA adjustments within a first nominal TDW. The UE can accumulate TA adjustments during the first nominal TDW and apply the accumulated TA adjustment in a second nominal TDW, wherein the second nominal TDW is after the first nominal TDW and the last slot of the first nominal TDW and the first slot of the second nominal TDW can be consecutive or non-consecutive slots. It is possible that the UE does not accumulate TA adjustments during the first nominal TDW and applies the last TA adjustment indicated in the first nominal TDW in the second nominal TDW. It is also possible that the UE does not accumulate TA adjustments during the first nominal TDW and applies the first TA adjustment indicated in the first nominal TDW in the second nominal TDW. The UE can be configured to accumulate TA commands that indicate a TA adjustment during a nominal TDW and apply the TA adjustment based on the accumulated TA commands after the nominal TDW.

In another embodiment a UE receives more than one TA commands that indicate TA adjustments within a first actual TDW. The UE can accumulate TA adjustments during the first actual TDW and apply the accumulated TA adjustment in a second actual TDW, wherein the second actual TDW is after the first actual TDW and the last slot of the first actual TDW and the first slot of the second actual TDW can be consecutive or non-consecutive slots. It is possible that the UE does not accumulate TA adjustments during the first actual TDW and applies the last TA adjustment indicated in the first actual TDW in the second actual TDW. It is also possible that the UE does not accumulate TA adjustments during the first actual TDW and applies the first TA adjustment indicated in the first actual TDW in the second actual TDW. The UE can be configured to accumulate TA commands that indicate a TA adjustment during an actual TDW and apply the TA adjustment based on the accumulated TA commands after the actual TDW.

It is possible that the UE accumulates TA commands during a time domain window when the PUSCH transmission with repetitions is a Type 1 CG-PUSCH or a Type 2 CG-PUSCH and does not accumulate TA commands when it is a DG-PUSCH transmission. Alternatively, UE accumulates TA commands during a time domain window when the PUSCH transmission with repetitions is a DG-PUSCH transmission and does not accumulate TA commands when it is a Type 1 CG-PUSCH or a Type 2 CG-PUSCH. It is also possible that accumulation of TA commands during a time domain window is only performed for DG-PUSCH and not for Type 1 CG-PUSCH or a Type 2 CG-PUSCH, or vice versa.

FIG. 13 illustrates an example method 1300 for a UE to calculate a TA adjustment during a second time window using TA commands received during a first time window according to embodiments of the present disclosure. The embodiment of the example method 1300 for a UE to calculate a TA adjustment during a second time window using TA commands received during a first time window illustrated in FIG. 13 is for illustration only. FIG. 13 does not limit the scope of this disclosure to any particular implementation of the example method 1300 for a UE to calculate a TA adjustment during a second time window using TA commands received during a first time window.

As illustrated in FIG. 13, in step 1310, a UE is configured for operation with DM-RS bundling and is configured/indicated to transmit a PUSCH with repetitions. In step 1320, the UE is configured to accumulate TA adjustments during a time domain window of DM-RS bundling. In step 1330, the UE receives one or more TA commands indicating TA adjustments within a first time domain window and accumulates TA commands within the first time domain window. In step 1340, the UE performs an adjustment of the UL timing based on the accumulated TA command in a second time domain window. In step 1350, the UE transmits PUSCH repetitions in a second time domain window.

For a UE configured for operation with DM-RS bundling, according to example (a) of FIG. 6, a timing of a TA adjustment is determined according to the method for timing adjustment in in 3GPP TS 38.211 Clause 4.3 and 3GPP TS 38.214 Clause 4.2, and is determined to be in a slot m, wherein the slot in is within a TDW. The UE applies the TA adjustment after the TDW. In this example the TA adjustment is not an event that causes the termination of a TDW. According to example (b) of FIG. 6, the UE terminates the operation of DM-RS bundling in slot m−1 in order to apply the TA adjustment in slot m. The TA adjustment is an event that causes power consistency and phase continuity not to be maintained across slots of the TDW and the TDW is terminated. The UE can be configured to apply the TA adjustment according to example (a) or example (b) of FIG. 6. Thus, the UE can be configured to postpone the application of the TA adjustment when the timing of the TA adjustment is determined to be within a TDW or can be configured not to postpone the application of the TA adjustment when the timing of the TA adjustment is determined to be within a TDW.

In addition to a timing adjustment due to a timing advance command received on uplink slot n, with a corresponding adjustment of the uplink transmission timing that applies from the beginning of uplink slot $n+k+1+2^{\mu} \cdot K_{offset}$, determined according to the procedure for timing adjustment in 3GPP TS 38.211 Clause 4.3 and 3GPP TS 38.214 Clause 4.2, and subject to a postponement of a number of slots in case of example (b) of FIG. 6, the UE can apply a pre-adjustment before applying the timing adjustment corresponding to the TA command. For example, in a non-terrestrial network (NTN), with transparent satellite payload, due to a large and time-varying propagation delay, the UE needs to apply an open loop timing adjustment in addition to the timing adjustment indicated by the TA command, which can be referred to as a closed loop timing adjustment. The open loop timing adjustment is typical of the NTN and comprises a cell-specific or common TA adjustment that is related to the link between a gNB and a satellite, and a UE-specific TA adjustment that is related to the link between the satellite and the UE. The gNB indicates the common TA adjustment to the UE, and additionally provides higher-layer ephemeris parameters for a serving satellite that allow the UE to calculate an update of the common TA adjustment in-between receptions of the indication of the common TA by the network. The gNB can provide the common TA adjustment information with a periodicity P, and the common TA adjustment can have a validity duration periodicity that can be same or larger than P. The UE-specific TA adjustment is estimated by the UE using its position and the satellite position, which are known from its GNSS and from the satellite ephemeris, respectively.

Thus, a UE can apply an open-loop timing adjustment based on a common TA adjustment and/or on a UE-specific TA adjustment.

In one example an open loop adjustment of an uplink transmission timing applies in a slot of a TDW, wherein the slot can be any of the slots of the TDW, and the adjustment does not cause an interruption of the TDW. For example, if a phase change caused by the timing adjustment is below a given value, wherein the value can be a fixed value, or a configured value, or subject to a UE capability, the UE can apply the timing adjustment without interrupting the TDW. It is possible that if the timing adjustment value is below a given value, wherein the value can be a fixed value, or a configured value, or subject to a UE capability, the UE can apply the timing adjustment without interrupting the TDW. It is also possible that the UE applies a timing adjustment with a periodicity of a number of slots or symbols, wherein each timing adjustment value does not exceed a given value, without interrupting the TDW. The periodicity of the application of the timing adjustment can be of a number of slots or symbols, and can be configured by higher layer and/or subject to a UE capability.

In one example a first open loop adjustment of an uplink transmission timing applies in a slot n of a TDW, and a second open loop adjustment of an uplink transmission timing applies in a slot m of the TDW. Thus, multiple open loop adjustments can be applied in slots of a same TDW, and the adjustments do not cause an interruption of the TDW.

In one example an open loop adjustment of an uplink transmission timing applies in an initial slot at a start of a TDW independently on whether or not the UE applies a closed loop timing adjustment due to the reception of the TA command in any of the slots of the TDW.

In one example an open loop adjustment of an uplink transmission timing applies in a slot where also a closed loop adjustment applies.

In one example an open loop adjustment of the uplink transmission timing applies in a slot where a validity duration associated with a common TA and/or to satellite ephemeris parameters expires.

In one example an open loop adjustment of the uplink transmission timing applies in a slot that is associated with the slot where the closed loop timing adjustment applies, for example the slot where the open loop adjustment applies is x slot before the slot where the closed loop timing adjustment applies.

When an open loop timing adjustment applies in slot m of a TDW that is not a first slot of the TDW, in a first approach a UE does not apply the open loop timing adjustment in slot m and postpones applying the timing adjustment until a first slot of a next TDW. In a second approach, the UE applies the open loop timing adjustment in slot m and slot m becomes the first slot of a new TDW. In a third approach, the UE applies the open loop timing adjustment in slot m only if a closed loop timing adjustment applies also in slot m.

FIG. 14 illustrates an example method 1400 for a UE to apply an open loop timing adjustment in a first slot of a first TDW and apply a closed loop timing adjustment based on a TA command that interrupts the first TDW according to embodiments of the present disclosure. The embodiment of the example method 1400 for a UE to apply an open loop timing adjustment in a first slot of a first TDW and apply a closed loop timing adjustment based on a TA command that interrupts the first TDW illustrated in FIG. 14 is for illustration only. FIG. 14 does not limit the scope of this disclosure to any particular implementation of the example method 1400 for a UE to apply an open loop timing adjustment in a first slot of a first TDW and apply a closed loop timing adjustment based on a TA command that interrupts the first TDW.

As illustrated in FIG. 14, in step 1410, a UE is configured for operation with DM-RS bundling and is configured/indicated to transmit a PUSCH with repetitions. In step 1420, the UE determines an open loop timing adjustment and applies the open loop timing adjustment in a first slot of a first TDW. In step 1430, the UE determines a closed loop timing adjustment that applies to slot m within the first TDW and interrupts the first TDW. In step 1440, the UE applies the closed loop timing adjustment in slot m that is the first slot of a second TDW.

FIG. 15 illustrates an example method 1500 for a UE to apply an open loop timing adjustment in a slot of a TDW according to embodiments of the present disclosure. The embodiment of the example method 1500 for a UE to apply an open loop timing adjustment in a slot of a TDW illustrated in FIG. 15 is for illustration only. FIG. 15 does not limit the scope of this disclosure to any particular implementation of the example method 1500 for a UE to apply an open loop timing adjustment in a slot of a TDW.

As illustrated in FIG. 15, in step 1510, a UE is configured for operation with DM-RS bundling and is configured/indicated to transmit a PUSCH with repetitions. In step 1520, the UE determines an open loop timing adjustment and applies the open loop timing adjustment in a slot m within a TDW. In step 1530, the UE transmits PUSCH repetitions in all slots of the TDW with same power.

A UE can be configured to accumulate TA commands that indicate TA adjustments during a TDW and can be also configured to accumulate TPC commands during the TDW. A gNB can configure TPC command accumulation and TA command accumulation separately or configure a single parameter that enables accumulation of TPC commands and TA commands during a time domain window that would be applied to calculate the transmit power and the uplink timing adjustment for transmission after the time domain window. It is also possible that the gNB configures accumulation of TPC commands during a time domain window that would be applied to calculate the transmit power in another time window, and such configuration does not apply to TA accumulation.

It is possible that when a UE is configured to accumulate TA commands that indicate a TA adjustment during a time domain window, the UE applies the corresponding accumulated timing adjustment when the time window changes. It is also possible that when the UE is configured to accumulate TA commands that indicate TA adjustments during a time domain window, the UE can be also configured to accumulate some or all of the TA commands within the time domain window, and apply a corresponding accumulated timing adjustment value in a slot corresponding to a last accumulated TA command, wherein the last accumulated TA command can be any of the TA command within the time domain window. When the accumulated time adjustment is applied a new time domain window starts and the first slot of the new time domain window is the slot where the accumulated timing adjustment is applied. Alternatively, the accumulated timing adjustment is applied in a slot of the time domain window and the time domain window remains unchanged. For example, when the timing adjustment is within a certain range or is smaller than a maximum value, wherein the maximum value can be configured, indicated or fixed, or also subject to a UE capability associated with the maximum value of the timing adjustment, the time domain window during which the time adjustment is applied, remains unchanged.

FIG. 16 illustrates an example method 1600 for a UE to determine a transmit power based on accumulated TPC commands and determine a TA adjustment based on a single TA command according to embodiments of the present disclosure. The embodiment of the example method 1600 for a UE to determine a transmit power based on accumulated TPC commands and determine a TA adjustment based on a single TA command illustrated in FIG. 16 is for illustration only. FIG. 16 does not limit the scope of this disclosure to any particular implementation of the example method 1600 for a UE to determine a transmit power based on accumulated TPC commands and determine a TA adjustment based on a single TA command.

As illustrated in FIG. 16, in step 1610, a UE is configured for operation with DM-RS bundling and is configured/indicated to transmit a PUSCH with repetitions. In step 1620, the UE is configured to accumulate TPC commands during a time domain window of DM-RS bundling at step. In step 1630, the UE accumulates TPC commands within a first time domain window and determines a transmit power for transmission in a second time domain window based on the accumulated TPC commands. In step 1640, the UE performs an adjustment of the UL timing in the second time domain window based on a single TA command, wherein the corresponding timing of a TA adjustment is during the first time domain window. In step 1650, the UE transmits PUSCH repetitions with the determined transmit power in the second time domain window after the TA adjustment. In the example of FIG. 16 the first time domain window and the second time domain window can be nominal or actual time domain window wherein the last slot or last symbol of the first nominal or actual TDW and the first slot or first symbol of the second nominal or actual TDW can be consecutive or non-consecutive slots or symbols.

FIG. 17 illustrates an example method 1700 for a UE to determine a transmit power based on accumulated TPC commands and to terminate a DM-RS bundling TDW to apply a TA adjustment according to embodiments of the present disclosure. The embodiment of the example method 1700 for a UE to determine a transmit power based on accumulated TPC commands and to terminate a DM-RS bundling TDW to apply a TA adjustment illustrated in FIG.

17 is for illustration only. FIG. 17 does not limit the scope of this disclosure to any particular implementation of the example method 1700 for a UE to determine transmit power based on accumulated TPC commands and to terminate a DM-RS bundling TDW to apply a TA adjustment.

As illustrated in FIG. 17, in step 1710, a UE is configured/indicated to transmit a PUSCH with repetitions. In step 1720, the UE is configured for operation with DM-RS bundling and is configured to accumulate TPC commands during a time domain window of DM-RS bundling and to apply a TA adjustment as an event. In step 1730, the UE determines a slot m for TA adjustment, wherein the slot m is within a TDW, and terminates the TDW in slot m−1. In step 1740, the UE applies the TA adjustment in slot m. In step 1750, the UE restarts DM-RS bundling in a slot n after applying the TA adjustment, wherein the slot index n can be same or larger than m.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
    receive, from a base station, first information indicating that restarting a time domain window (TDW) after an event which causes power consistency and phase continuity not to be maintained in a nominal TDW is enabled, wherein the nominal TDW includes a first actual TDW and a second actual TDW, and
    receive, from the base station, a timing advance command, wherein timing adjustment in the nominal TDW as a response to the timing advance command is the event which causes power consistency and phase continuity not to be maintained; and
a processor operably coupled to the transceiver, the processor configured to determine that a start of the second actual TDW is a first symbol of a physical uplink shared channel (PUSCH) transmission after the event based on the first information, wherein the PUSCH transmission is in a slot related to a PUSCH repetition.

2. The UE of claim 1, wherein the UE is capable of restarting demodulation-reference signal (DM-RS) bundling after the event.

3. The UE of claim 1, wherein the time advance command is included in a medium access control (MAC) control element (MAC CE).

4. The UE of claim 1, wherein:
the processor is further configured to determine a second power for the PUSCH transmission in the second actual TDW, and
the transceiver is further configured to transmit a PUSCH based on the second power after the event.

5. A base station (BS) comprising:
a processor configured to configure a slot for a physical uplink shared channel (PUSCH) repetition and a nominal time domain window (TDW), wherein the nominal TDW includes a first actual TDW and a second actual TDW; and
a transceiver operably coupled to the processor, the transceiver configured to:
    transmit, to a user equipment (UE), first information indicating that restarting a TDW after an event which causes power consistency and phase consistency not to be maintained in the nominal TDW is enabled, and transmit, to the UE, a timing advance command,
    wherein timing adjustment in the nominal TDW as a response to the timing advance command is the event which causes power consistency and phase continuity not to be maintained, and
    wherein the first information enables the UE to determine that a start of the second actual TDW is a first symbol of a PUSCH transmission after the event, wherein the PUSCH transmission is in a slot related to the PUSCH repetition.

6. The BS of claim 5, wherein UE is capable of restarting demodulation-reference signal (DM-RS) bundling after the event.

7. The BS of claim 5, wherein the time advance command is included in a medium access control (MAC) control element (MAC CE).

8. The BS of claim 5, wherein:
the transceiver is further configured to receive, from the UE, a PUSCH based on a second power, and
the second power for the PUSCH transmission is related to the second actual TDW.

9. A method performed by a user equipment (UE), the method comprising:
receiving, from a base station, first information indicating that restarting a TDW after an event which causes power consistency and phase consistency not to be maintained in a nominal TDW is enabled, wherein the nominal TDW includes a first actual TDW and a second actual TDW;
receiving, from the base station, a timing advance command, wherein timing adjustment in the nominal TDW as a response to the timing advance command is the event which causes power consistency and phase continuity not to be maintained; and
determining that a start of the second actual TDW is a first symbol of a physical uplink shared channel (PUSCH) transmission after the event based on the first information, wherein the PUSCH transmission is in a slot related to a PUSCH repetition.

10. The method of claim 9, wherein the UE is capable of restarting demodulation-reference signal (DM-RS) bundling after the event.

11. The method of claim 9, wherein the time advance command is included in a medium access control (MAC) control element (MAC CE).

12. The method of claim 9, further comprising:

determining a second power for the PUSCH transmission in the second actual TDW; and transmitting a PUSCH based on the second power after the event.

* * * * *